(12) United States Patent
Shankaranarayanan

(10) Patent No.: US 9,456,090 B2
(45) Date of Patent: *Sep. 27, 2016

(54) DEVICES, SYSTEMS, AND METHODS FOR SPONSORED TETHERED CONNECTIVITY

(71) Applicant: AT&T Intellectual Property I, L.P., Atlanta, GA (US)

(72) Inventor: Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,089

(22) Filed: Jun. 29, 2015

(65) Prior Publication Data

US 2015/0319804 A1    Nov. 5, 2015

Related U.S. Application Data

(63) Continuation of application No. 14/448,312, filed on Jul. 31, 2014, now Pat. No. 9,088,672, which is a continuation of application No. 13/086,387, filed on Apr. 13, 2011, now Pat. No. 8,831,517.

(51) Int. Cl.
*H04W 4/00*     (2009.01)
*H04W 88/04*    (2009.01)
*H04L 12/14*    (2006.01)
(Continued)

(52) U.S. Cl.
CPC .......... *H04M 15/59* (2013.01); *H04L 12/1475* (2013.01); *H04W 4/008* (2013.01); *H04W 4/24* (2013.01); *H04W 12/06* (2013.01); *H04W 12/08* (2013.01); *H04W 76/023* (2013.01); *H04W 88/04* (2013.01); *H04W 88/06* (2013.01); *H04W 88/16* (2013.01)

(58) Field of Classification Search
CPC .. H04L 12/1475; H04W 4/008; H04W 88/04
See application file for complete search history.

(56) References Cited

U.S. PATENT DOCUMENTS 7,821,987 B2  10/2010  Rodriguez et al.
7,860,725 B2  12/2010  Gopinathan
(Continued)

FOREIGN PATENT DOCUMENTS

WO    WO 02/30145       4/2002
WO    WO 2013/000701    1/2013
(Continued)

OTHER PUBLICATIONS

U.S. Office Action dated Jul. 29, 2013 in U.S. Appl. No. 13/086,387.
(Continued)

*Primary Examiner* — Bobbak Safaipour
*Assistant Examiner* — Devan Sandiford
(74) *Attorney, Agent, or Firm* — Hartman & Citrin LLC

(57) ABSTRACT

Devices, systems, and methods are disclosed which relate to establishing a sponsored tethered connectivity (STC) connection by tethering a special purpose connected device (SPCD) through a tethering mobile device having network access. The SPCD accesses an application server on the network and is authenticated before service to the SPCD begins. Once authenticated, the service provider is billed for the STC connection instead of a user of the tethering mobile device.

20 Claims, 9 Drawing Sheets

(51) Int. Cl.
*H04M 15/00* (2006.01)
*H04W 88/06* (2009.01)
*H04W 4/24* (2009.01)
*H04W 12/06* (2009.01)
*H04W 12/08* (2009.01)
*H04W 88/16* (2009.01)
*H04W 76/02* (2009.01)

(56) References Cited

U.S. PATENT DOCUMENTS

| | | | |
|---|---|---|---|
| 8,364,148 B2 | 1/2013 | Dravida et al. | |
| 8,405,502 B2 | 3/2013 | Teague | |
| 8,488,541 B2 | 7/2013 | Schlack | |
| 8,565,204 B2 | 10/2013 | Kalhan | |
| 8,630,272 B2 | 1/2014 | Park et al. | |
| 8,948,728 B2 | 2/2015 | Haberman | |
| 2002/0173704 A1 | 11/2002 | Schulze | |
| 2004/0053599 A1 | 3/2004 | Karaoguz et al. | |
| 2004/0077374 A1* | 4/2004 | Terry | H04W 36/14 455/552.1 |
| 2004/0193684 A1* | 9/2004 | Ben-Yoseph | H04L 12/5815 709/204 |
| 2006/0031515 A1 | 2/2006 | Van Gassel | |
| 2006/0172769 A1 | 8/2006 | Oh | |
| 2007/0032225 A1* | 2/2007 | Konicek | H04M 1/72513 455/417 |
| 2007/0124809 A1 | 5/2007 | Narin et al. | |
| 2008/0033802 A1 | 2/2008 | McKenna | |
| 2008/0058614 A1 | 3/2008 | Banet | |
| 2008/0146277 A1 | 6/2008 | Anglin | |
| 2009/0005005 A1 | 1/2009 | Forstall et al. | |
| 2009/0125413 A1 | 5/2009 | Le Chevalier | |
| 2009/0177996 A1 | 7/2009 | Hunt | |
| 2010/0017471 A1 | 1/2010 | Brown | |
| 2010/0205099 A1 | 8/2010 | Ahmavaara et al. | |
| 2010/0227585 A1* | 9/2010 | Carroll | H04M 11/04 455/404.2 |
| 2011/0055901 A1 | 3/2011 | Karaoguz et al. | |
| 2011/0087782 A1 | 4/2011 | Bouckaert et al. | |
| 2011/0294502 A1 | 12/2011 | Oerton | |
| 2012/0054353 A1 | 3/2012 | Jung et al. | |
| 2012/0079043 A1 | 3/2012 | Brown et al. | |
| 2012/0116886 A1 | 5/2012 | Manku | |
| 2012/0155380 A1 | 6/2012 | Hodges | |
| 2013/0219471 A1 | 8/2013 | Brown et al. | |
| 2013/0238473 A1 | 9/2013 | Fan et al. | |
| 2013/0242969 A1 | 9/2013 | Schlack | |
| 2013/0272227 A1 | 10/2013 | Gallagher et al. | |
| 2013/0272228 A1 | 10/2013 | Gallagher et al. | |
| 2013/0273956 A1 | 10/2013 | Gallagher et al. | |
| 2013/0331028 A1 | 12/2013 | Kuehnel et al. | |
| 2015/0250021 A1 | 9/2015 | Stice et al. | |

FOREIGN PATENT DOCUMENTS

| | | |
|---|---|---|
| WO | WO 2013/095382 | 6/2013 |
| WO | WO 2013/147823 | 10/2013 |

OTHER PUBLICATIONS

U.S. Office Action dated Dec. 13, 2013 in U.S. Appl. No. 13/086,387.
U.S. Notice of Allowance dated Apr. 28, 2014 in U.S. Appl. No. 13/086,387.
U.S. Notice of Allowance dated Mar. 12, 2015 in U.S. Appl. No. 14/448,312.
U.S. Office Action dated May 6, 2015 in U.S. Appl. No. 14/193,356.
U.S. Notice of Allowance dated Dec. 15, 2015 in U.S. Appl. No. 14/193,356.
International Search Report and Written Opinion dated Jun. 9, 2015 in International Application No. PCT/US2015/017752.
"Surface blades: Microsoft bets on accessories as the future of tablets," Sep. 24, 2013, retrieved from http://www.theverge.com/2013/9/24/4765048/can-microsofts-futuristic-blade-accessories-give-the-surface-the-edge on Feb. 19, 2014.
"IMEC: 7Gbit/s 60GHz wireless transceiver for tablets," May 2012, retrieved from http://www.electronicsweekly.com/news/design/communications/imec-7gbits-60ghz-wireless-transceiver-for-tablets-2012-05/ on Feb. 19, 2014.
"Sierra Wireless outs thinnest-ever 4G LTE module, teases skinny AT&T-ready laptops and tablets," Jun. 7, 2012, retrieved from http://www.engadget.com/2012/06/07/sierra-wireless-em7700-4g-Lte-module/ on Feb. 19, 2014.
"Wireless Accessory Kit," 2012, retrieved from https://store.wacom.com/us/en/product/ACK40401 on Feb. 19, 2014.
"Sierra Wireless launches new generation 4G LTE modules for notebooks and tablets," Feb. 4, 2014, retrieved from http://www.sierrawireless.com/en/Newsroom/newsreleases/2014/020414-Sierra_Wireless_launches_new_generation_4G_LTE_modules_for_notebooks_and_tablets.aspx on Feb. 19, 2014.
"Wi-Fi Direct—Wikipedia, the free encyclopedia," retrieved from https://en.wikipedia.org/w/index.php?title=Wi-Fi_Direct &oldid=463375983, dated Nov. 30, 2011.
U.S. Appl. No. 14/663,996, filed on Mar. 20, 2015.
U.S. Office Action dated Jun. 10, 2016 in U.S. Appl. No. 14/663,996.

* cited by examiner

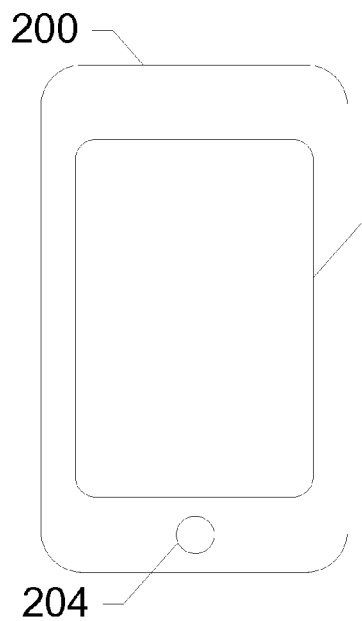
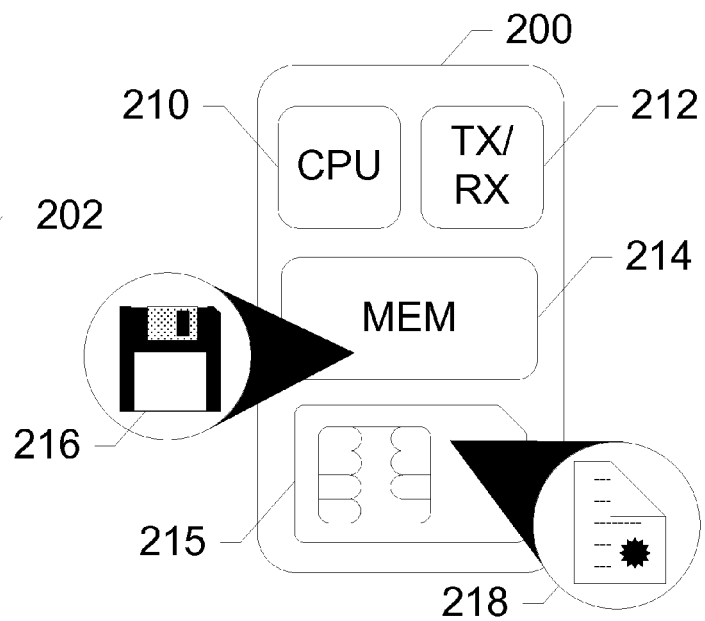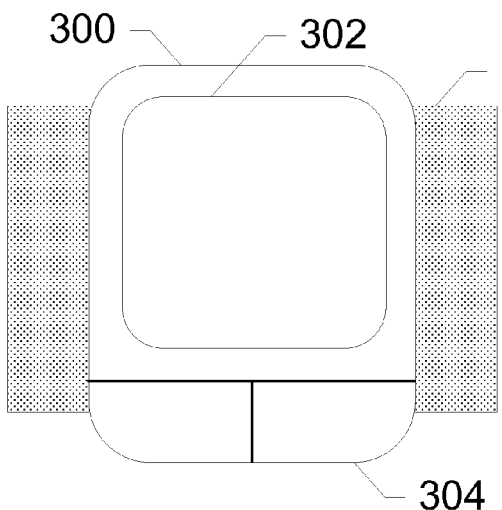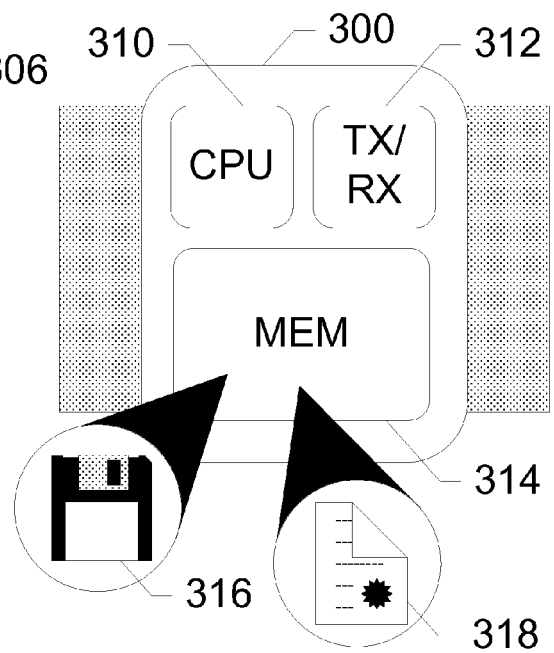

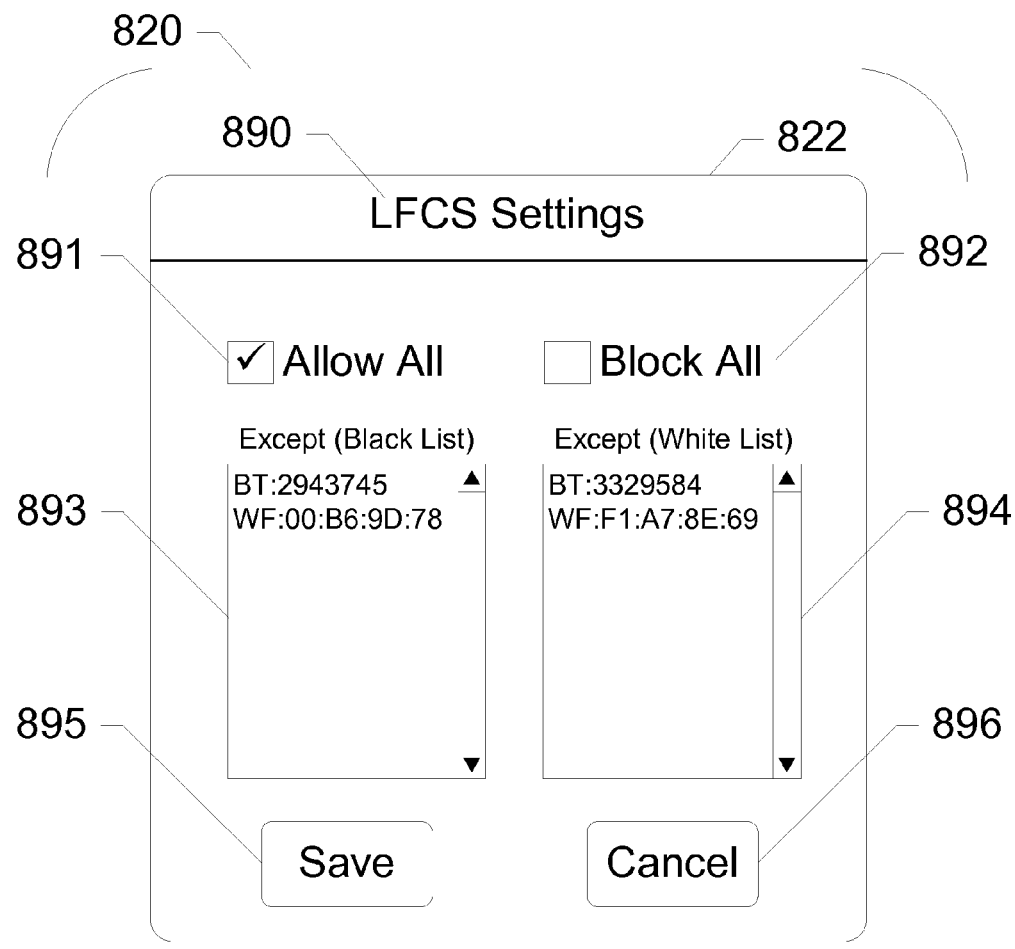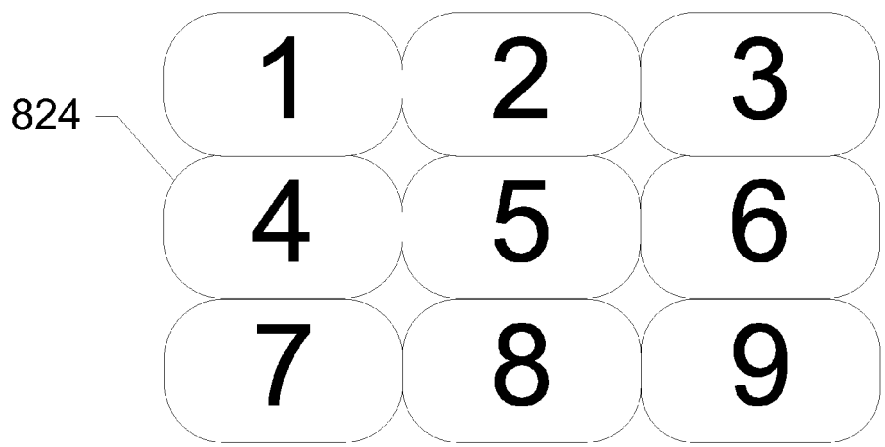
FIG. 8

DEVICES, SYSTEMS, AND METHODS FOR SPONSORED TETHERED CONNECTIVITY

CROSS-REFERENCE TO RELATED APPLICATION

This application is a continuation of U.S. patent application Ser. No. 14/448,312, filed Jul. 31, 2014, now U.S. Pat. No. 9,088,672, which is a continuation of U.S. patent application Ser. No. 13/086,387, filed Apr. 13, 2011, now U.S. Pat. No. 8,831,517, each of which is incorporated herein by reference in its entirety.

BACKGROUND OF THE SUBJECT DISCLOSURE

1. Field of the Subject Disclosure

The present subject disclosure relates to sponsored connectivity. More specifically, the present subject disclosure relates to providing connectivity through a tethering mobile device.

2. Background of the Subject Disclosure

Various vertically-integrated special-purpose connected devices (SPCD), like E-READERs, BLUETOOTH connected medical devices, cameras, etc., benefit from having mobile network connectivity for specific tasks. In contrast with generic Internet access, some SPCDs are available with a cellular modem that is used for specific tasks such as downloading e-books. This is referred to as Limited Functionality Cellular Service (LFCS). Typically, the LFCS is not a general means of accessing the mobile Internet for the needs of the end-user, but accesses a specific service. Other examples of SPCDs with LFCS are meters which upload meter readings, or download special information. However, the price of the device typically includes unlimited cellular service for specific tasks such as downloading books. The cost of cellular service is presumably recovered from the seller of the device or the content. Since the user incurs no connection costs, the connection is referred to as sponsored connectivity. In other words, the mobile network operator recovers the cost from the provider of the special content or service.

At the same time, mobile devices, such as cellular telephones, have become a common tool of everyday life. Cellular telephones are no longer used simply to place telephone calls. With the number of available features rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user. Many of these devices support multiple communication protocols in addition to cellular, including WiFi, BLUETOOTH, ZIGBEE, Z-WAVE, etc.

One problem is to enable cellular access without using an in-built cellular modem. For cost and complexity reasons, the inclusion of a cellular modem may not be feasible or cost-effective for SPCDs that only need occasional cellular service, such as a blood pressure meter. There is, and will continue to be, market pressure to save the cost of the cellular modem in the SPCD. In addition to cost restrictions, some devices may be too small to accommodate the modem. The need for connectivity may be infrequent and may not justify the cost of the cellular modem.

Thus, there is a need for access to the cellular network from these SPCDs that does not require a cellular modem on the SPCD.

SUMMARY OF THE SUBJECT DISCLOSURE

The present subject disclosure solves the above problems with devices, systems, and methods for establishing a sponsored tethered connection by tethering a special purpose connected device (SPCD) through a tethering mobile device having network access. The SPCD accesses an application server on the network, and is authenticated before service to the SPCD begins. Once authenticated, the application service provider is billed for the sponsored tethered connection instead of a user of the tethering mobile device.

Exemplary embodiments of the present subject disclosure equip SPCDs with a low-cost, short-range network interface, such as BLUETOOTH, Wi-Fi, ZIGBEE, Z-WAVE, etc., to communicate with and to obtain a network connection from a tethering mobile device. These exemplary embodiments provide a secure mechanism that allows SPCDs to be used with any suitable tethering mobile device without a tethering plan, or even a cellular data plan. The objective is to replace the built-in cellular modem of the SPCD and provide the same limited functionality to be used with potentially any tethering mobile device with or without a tethering data plan.

Exemplary embodiments of the present subject disclosure include a framework for sponsored tethered connectivity (STC) that enables secure access through any suitable tethering mobile device. Even tethering mobile devices that are not subscribed to a tethering data plan are capable of providing access. This enables mobile operators to offer STC to a very wide range of manufacturers of SPCDs. In order to access the internet from the SPCD, the user of the SPCD needs to have access to a communication device capable of tethering. However, the tethering mobile device does not need a tethering plan, and even if it has one, the sponsored tethered connectivity is treated separately from the other normal use of the existing mobile data service or plan. Thus, tethering provides the functionality of a built-in cellular modem in the SPCD without the additional costs involved in providing and operating the built-in cellular modem. This further enables a large class of devices to connect to the Internet via millions of tethering mobile devices. Exemplary embodiments of the present subject disclosure enable the connection in a secure, user-friendly, accountable manner that prevents misuse and fraud.

Further embodiments allow many more SPCDs to connect through a wide range of tethering mobile devices. The sponsored tethered connectivity separates, when needed, from a mobile data subscription plan, and enables an additional revenue stream for a mobile operator. With this system in place, any device manufacturers and service providers consider it a viable option to remove the cellular modem from the device if Bluetooth or WiFi is available. A smoothly executed sponsored tethered connectivity service is a sticky service for users with several SPCDs in that these users keep using their tethering mobile device on occasion for their EREADER, blood pressure meter, iPOD TOUCH, etc. For users with limited-data tethering plans, this provides a channel for their devices to be used with sponsored tethered connectivity. Exemplary embodiments of the present subject disclosure meter usage by the SPCD ID and not the tethering mobile device. The cost of usage is recovered by a mobile operator through contracts with third parties, or through a new class of sponsored tethered connectivity.

Sponsored tethered connectivity is flexible in terms of number of connections, time period, etc. Sponsored tethered connectivity may be restricted to a limited amount of data, or to specific time of day. Sponsored tethered connectivity also enables a better user interface using the display of the tethering mobile device instead of being constrained by the display of the SPCD.

In one exemplary embodiment, the present subject disclosure is a tethering mobile device for establishing sponsored tethered connectivity. The tethering mobile device includes a processor, a memory in communication with the processor, a short-range wireless communication transceiver in communication with the processor, a long-range wireless communication transceiver in communication with the processor, and a tether logic on the memory, the tether logic for receiving an LFCS request from a special purpose connectivity device (SPCD) through the short-range wireless communication transceiver, verifying the validity of the SPCD, and establishing an LFCS connection between the SPCD and an application server controlled by a service provider. The service provider is billed for the LFCS connection.

In another exemplary embodiment, the present subject disclosure is a system for establishing a limited functionality cellular service (LFCS). The system includes a tethering mobile device in communication with a network, a special purpose connectivity device (SPCD) in short-range communication with the tethering mobile device, and an LFCS logic on at least one server on the network, the LFCS logic for receiving an LFCS request from the SPCD via the tethering mobile device, establishing an LFCS connection between the SPCD and an application server, and instructing an accounting server to bill a service provider of the application server for the LFCS connection.

In yet another exemplary embodiment, the present subject disclosure is a method for establishing a limited functionality cellular connection (LFCS). The method includes receiving an LFCS request from a special purpose connectivity device (SPCD) forwarded through a tethering mobile device, establishing an LFCS connection between the SPCD and an application server controlled by a service provider, and billing an account under the service provider for the LFCS connection.

BRIEF DESCRIPTION OF THE DRAWINGS

FIGS. 2A and 2B respectively show exterior and interior components of a special purpose connected device, according to an exemplary embodiment of the present subject disclosure.

FIGS. 3A and 3B respectively show exterior and interior components of a medical special purpose connected device, according to an exemplary embodiment of the present subject disclosure.

FIG. 8 shows a screenshot of settings available for a tethering mobile device capable of allowing sponsored tethered connectivity, according to an exemplary embodiment of the present subject disclosure.

DETAILED DESCRIPTION OF THE SUBJECT DISCLOSURE

Figure 1:
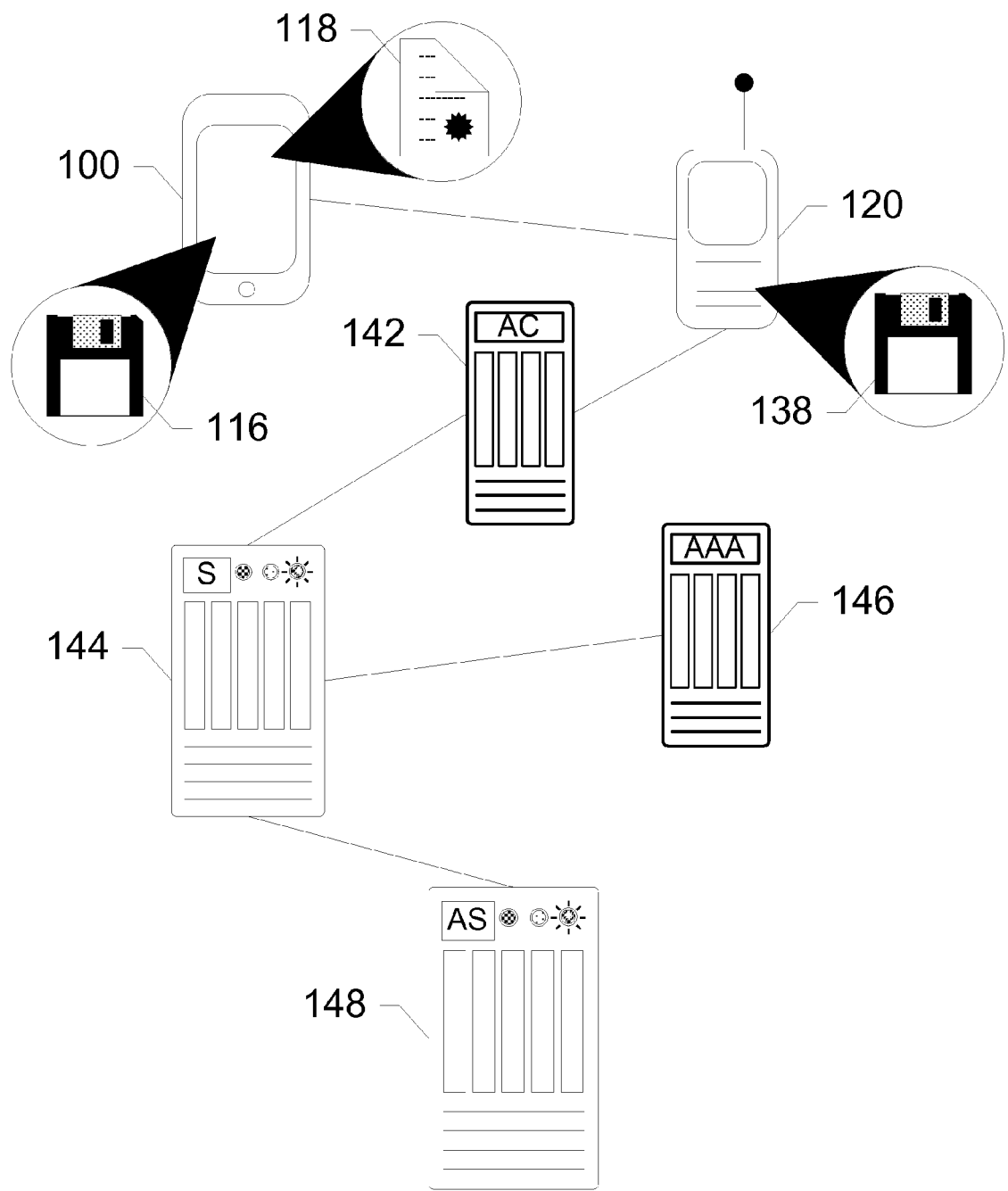
FIG. 1 shows a system for establishing sponsored tethered connectivity with a special purpose connected device through a tethering mobile device, according to an exemplary embodiment of the present subject disclosure.

The present subject disclosure solves the above problems with devices, systems, and methods for establishing sponsored tethered connectivity (STC) by tethering a special purpose connected device (SPCD) through a tethering mobile device having network access. The SPCD accesses an application server on the network, and is authenticated before service to the SPCD begins. Once authenticated, the service provider is billed for the STC connection instead of a user of the tethering mobile device.

"Tethering mobile device", as used herein and throughout this disclosure, refers to any electronic device capable of forwarding communication between two devices in communication with the tethering mobile device, where the two devices are not in direct communication with each other. A tethering mobile device may have a processor, a memory, at least one transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Sponsored tethered connectivity", as used herein and throughout this disclosure, refers to a connection provided through a tethering mobile device, yet billed to an account that is not associated with the tethering mobile device. The billed account may belong to a service provider in the case of an SPCD, another user in the case of a WiFi telephone, or a municipality in the case of an emergency service. In some cases the connection may be free, but authenticated, still at no cost to the tethering mobile device user.

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Tethering mobile devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH® Communication across a network is preferably packet-based; however, radio and frequency/amplitude modulations networks can enable communication between tethering mobile devices using appropriate analog-digital-analog converters and other elements. Communication is enabled by hardware elements called "transceivers." Tethering mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

For the following description, it can be assumed that most correspondingly labeled structures across the figures (e.g., 118 and 218, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for establishing sponsored tethered connectivity (STC) to a special purpose connected device (SPCD) 100 through a tethering mobile device 120, according to an exemplary embodiment of the present subject disclosure. The system includes SPCD 100 having SPCD logic 116 and a digital certificate 118, tethering mobile device 120 having a tether logic 138, an access control server 142, an STC server 144, an authentication, authorization, and accounting (AAA) server 146, and an application server 148. Under instruction from SPCD logic 116, SPCD 100 sends STC requests to tethering mobile device 120. For verification, SPCD 100 also sends a digital certificate to tethering mobile device 120, the digital certificate including an identification of SPCD 100, an address for application server 148, an STC account associated with the service provider, and an identifier of a home mobile operator. Tethering mobile device 120 receives the STC request, and performs a preliminary verification of the STC request before forwarding the STC request to access control server 142. Access control server 142 receives the STC request, determines that the STC request includes identification of the same home mobile operator, and forwards it to STC server 144. STC server 144 works with AAA server 146 to determine that the application server ID, the STC account ID, and the home mobile operator, are each part of a pre-approved set. STC server 144 then forwards the STC request to application server 148, which inspects the STC request, the validity of the digital certificate and ID of SPCD 100. Application server 148 verifies the service policy and the home mobile operator, then notifies STC server 144 to allow the STC connection. AAA server 146 updates billing to ensure that the STC connection is billed separately from the account of the subscriber of tethering mobile device 120, and billed to the STC account ID associated with the service provider. Once provisioning is complete, application server 148 and SPCD 100 engage in an STC connection. The STC connection ends when SPCD 100 or application server 148 closes the session.

There are many different types of SPCDs used for many different purposes. Besides the digital certificate, other means of identification credentials and authentication mechanisms can be used to validate the SPCD, including authentications based on SIM and USIM standards. Some SPCDs are used to view digital multimedia while other SPCDs measure vital statistics. In exemplary embodiments, SPCDs include emergency signals such as LIFE ALERT, automobile alarms, meters, cameras, etc. The ability of the network system to bill the service provider of the SPCD opens up even more possibilities in military and government as well as the private sector. Many of these possibilities will become recognizable by those having skill in the art upon reading this disclosure. Further, many more devices can potentially be SPCDs as well. For example, a WiFi telephone must connect to an access point to make voice calls. If the WiFi telephone places an emergency call, then the call is allowed by any tethering mobile device, which handles the call as an STC connection. Cellular telephones that are out of range of signal may still be in range of a tethering mobile device. These cellular telephones may act as SPCDs for placing emergency calls while out of range of network coverage.

FIG. 2A shows a special purpose connected device (SPCD) 200, according to an exemplary embodiment of the present subject disclosure. SPCD 200 includes a display 202 and a tactile input 204. A user interacts with SPCD 200 via tactile input 204, and views output through display 202. Display 202 is a liquid crystal display (LCD) which displays books and other multimedia. Display 202 may be a touch-sensitive input device, such as a touchscreen. SPCD 200 connects to an application server 148 to download new books and other multimedia. The user selects the media to view, download, or purchase through input 204 or through touchscreen 202. Input 204 is a trackball allowing the user to control a pointer on display 202 substantially similar to a computer mouse.

FIG. 2B shows the inner components of a special purpose connected device (SPCD) 200, according to an exemplary embodiment of the present subject disclosure. The inner components include a processor 210, a transceiver 212, a memory 214 having SPCD logic 216, and a subscriber identity module (SIM) card 215 having a digital certificate 218. Processor 210 receives input and issues commands to deliver output through the other components. Transceiver 212 converts wireless signals to information capable of processing by processor 210, and vice-versa. In the interest of cost savings, transceiver 212 uses one short-range wireless protocol, including WiFi, BLUETOOTH, ZIGBEE, Z-WAVE, etc., to communicate with tethering mobile devices and application servers. Memory 214 stores information as well as logic in the form of instructions for enabling processor 210 to operate the other components of SPCD 200, and includes SPCD logic 216. SIM card 215 stores digital certificate 218, an address for an application server, and an identification of each of SPCD 200, an STC account associated with the service provider, and a home mobile operator. SPCD logic 216 governs STC connections through tethering mobile devices.

In one exemplary embodiment, an SPCD is a low-cost connected blood pressure (BP) meter which has BLUETOOTH but does not have a cellular modem. The BP meter can connect through a wide range of suitable tethering mobile devices, including cellular telephones. In one simple instance, on first use, the user of the BP meter registers on the Internet, for instance, with a BP application server that is operated by a health service provider. The BP meter and the user's cellular telephone are paired over a BLUETOOTH connection. When the user needs to upload BP readings to the BP application server, she ensures that the cellular telephone is nearby, establishes the BLUETOOTH link, and then presses a button on the BP meter to upload the BP readings to the BP application server. The cellular telephone and the STC protocol on the network have mechanisms to ensure that only specific designated devices are allowed to access the STC service. The cellular telephone may display a message saying "This phone will be used to connect to a trusted service at no charge. Please press 'Yes' to proceed". There may be options to disable future questions for that particular SPCD device, which is identified by the SPCD ID.

In specific exemplary embodiments, the SPCD has digital X.509 certificates which prove the identity of the device, confirm that the device is authorized to access the mobile network, and identify the server that needs to be contacted. These digital X.509 certificates are unique to the device and managed by the issuer such that duplicates are not issued. Digital X.509 certificates provide cryptographically verifiable proof of the identity of the device. These digital X.509 certificates can be inserted into the hardware or software of the device. Communication from the cellular telephones to application servers can easily be identified and treated separately for billing purposes. A higher level of trust can be obtained by the mediation by a digital X.509 certificate of a tethering mobile device to provide confidence that the data is being sent to a trusted web server. In some embodiments, the SPCD is capable of end-to-end encryption.

In other specific exemplary embodiments, the SPCD has been provisioned with a SIM card which provides an identity of the SPCD, confirms that the SPCD is authorized to access the mobile network, and identifies the server that needs to be contacted. These SIM cards are unique to the SPCD and are managed by the issuer, the application service provider. The home mobile operator issues and manages the SIM card on behalf of the application service provider.

FIG. 3A shows a medical special purpose connected device (SPCD) 300, according to an exemplary embodiment of the present subject disclosure. SPCD 300 includes a display 302, buttons 304, and arm band 306. A user interacts with SPCD 300 via buttons 304, and views output through display 302. Display 302 is a liquid crystal display (LCD) which displays blood pressure and other medical information. SPCD 300 connects to an application server 148 to upload new readings, statistics, and other information. The user selects the readings to upload, download, or view through buttons 304. In this exemplary embodiment, SPCD 300 is a blood pressure monitor which uses arm band 306 along with other sensor hardware (not shown) to measure a user's blood pressure.

FIG. 3B shows the inner components of a medical special purpose connected device 300, according to an exemplary embodiment of the present subject disclosure. The inner components include a processor 310, a transceiver 312, and a memory 314 having SPCD logic 316 and a digital certificate 318. Processor 310 receives input and issues commands to deliver output through the other components. Transceiver 312 converts wireless signals to information capable of processing by processor 310, and vice-versa. In the interest of cost savings, transceiver 312 uses one short-range wireless protocol, including WiFi, BLUETOOTH, ZIGBEE, Z-WAVE, etc., to communicate with tethering mobile devices 120 and application servers 148. Memory 314 stores information including logic that comprises instructions for enabling processor 310 to operate the other components of SPCD 300, and includes SPCD logic 316, digital certificate 318, an address for an application server 148, and an identification of each of SPCD 200, an STC account associated with the service provider, and a home mobile operator. Digital certificate 318 may be an X.509 certificate. SPCD logic 316 governs STC connections through tethering mobile devices.

Figure 4A:
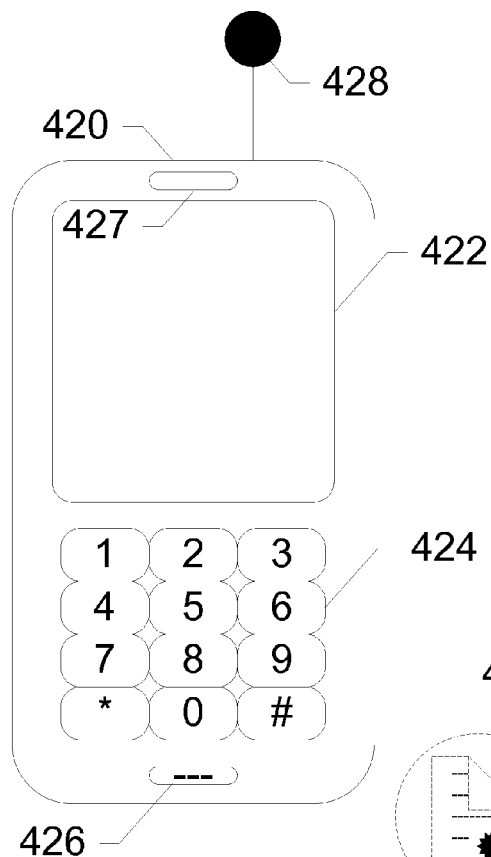
FIGS. 4A and 4B respectively show exterior and interior components of a tethering mobile device, according to an exemplary embodiment of the present subject disclosure.

FIG. 4A shows a tethering mobile device 420, according to an exemplary embodiment of the present subject disclosure. Tethering mobile device 420 includes a display 422, a keypad 424, a microphone 426, a speaker 427, and an antenna 428. Display 422 is a liquid crystal display (LCD) that serves as a visual output for the user. Display 422 is used to display, among other things, settings for STC connections. Keypad 424 is an input for entering information and commands to tethering mobile device 420. Microphone 426 accepts aural input and allows tethering mobile device 420 to deliver voice communication to the network and other tethering mobile devices. Speaker 427 outputs audio and also allows voice communication with other tethering mobile devices. Antenna 428 sends and receives wireless radio frequency (RF) signals to and from wireless networks and other wireless devices.

Figure 4B:
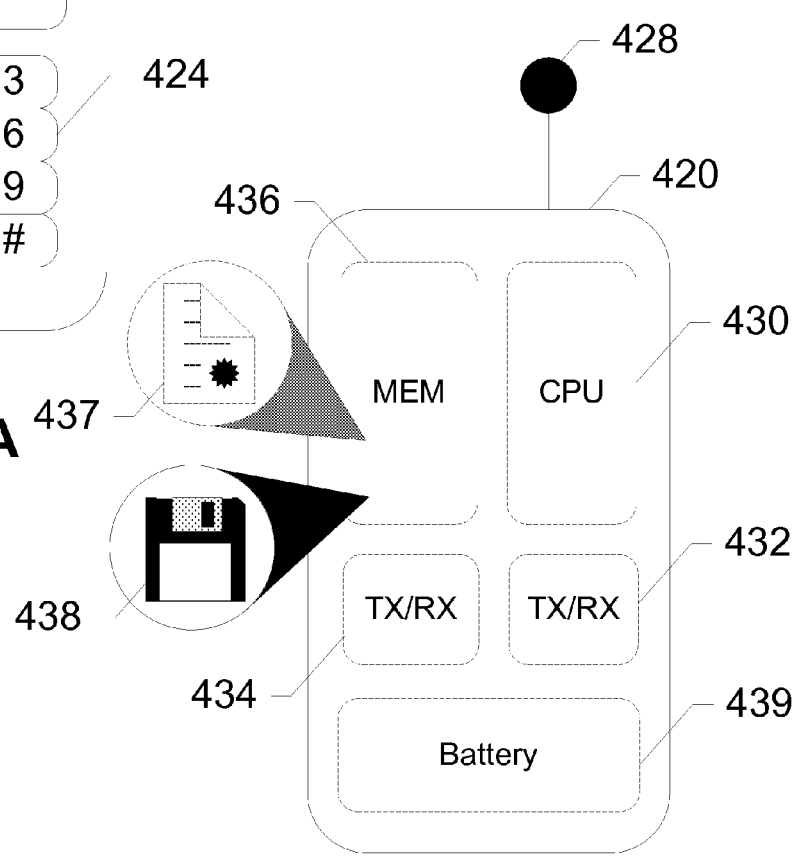

FIG. 4B shows the inner components of a tethering mobile device 420, according to an exemplary embodiment of the present subject disclosure. The inner components of tethering mobile device 420 include a processor 430, a memory 436 storing a tether logic 438 and a digital certificate 437, a short-range transceiver 432, a long-range transceiver 434, and a battery 439. Processor 430 receives input and issues commands to deliver output through the other components. Memory 436 stores information including logic for enabling processor 430 to operate the other components of tethering mobile device 420, and further stores tether logic 438. Tether logic 438 verifies and allows SPCDs to communicate with application servers through tethering mobile device 420. Digital certificate 437 is optionally included to allow tethering mobile device 420 to communicate through other tethering mobile devices. Short-range transceiver 432 and long-range transceiver 434 convert wireless signals received by antenna 428 to information capable of processing by processor 430, and vice-versa. Long-range transceiver 434 uses long-range wireless protocols, including cellular RF, etc., to communicate with the cellular network and other tethering mobile devices. Short-range transceiver 432 uses short-range wireless protocols, including WiFi, BLUETOOTH, ZIGBEE, Z-WAVE, etc., to communicate with SPCDs and other wireless communication devices within range. Battery 439 powers tethering mobile device 420, and may be rechargeable via an external power source.

There are many embodiments of a tethering mobile device that are capable of being used in accordance with the present subject disclosure. For instance, many legacy model cellular telephones are capable of executing the tethering logic described above. In other embodiments of the tethering mobile device, other displays are used, such as an LED display, OLED display, etc. In some embodiments, the display is used as a touch-sensitive input device, i.e. a touch screen. A touch screen allows the user to view output on the display as well as use the display to provide input. In some touch screen embodiments, the mobile device may not have a physical keypad for input. Instead, a virtual keypad is displayed on the touch screen and the user inputs by touching the virtual keys. Other forms of input such as full keyboards, accelerometers, motion sensors, etc., can be utilized in the mobile device. The memory can be a non-removable internal memory, or a removable memory such as in a subscriber identity module (SIM) card or a memory card inserted into a memory card reader. Many mobile devices have more than one transceiver or a transceiver that supports more than one protocol. For instance, it is not uncommon for a mobile device to support cellular radio frequency (RF), WiFi, and BLUETOOTH® protocols.

Figure 5:
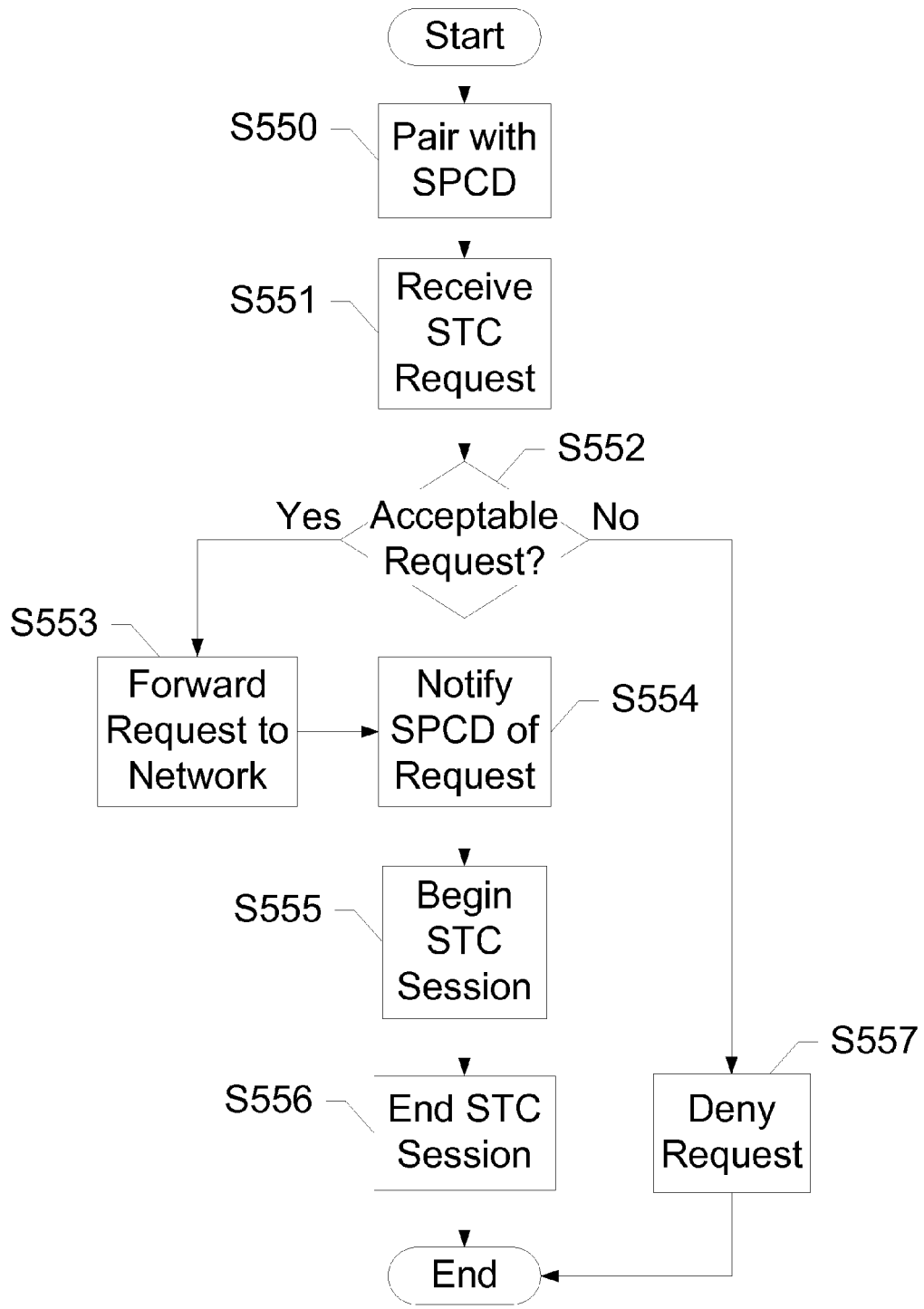
FIG. 5 shows a method for allowing a special purpose connected device to communicate under sponsored tethered connectivity through a tethering mobile device, according to an exemplary embodiment of the present subject disclosure.

FIG. 5 shows a method for allowing a special purpose connected device (SPCD) to communicate under sponsored tethered connectivity (STC) through a tethering mobile device, according to an exemplary embodiment of the present subject disclosure. Initial contact is established between the SPCD and the tethering mobile device using methods similar to BLUETOOTH and WiFi discovery for tethered devices. The method begins when the SPCD pairs with the tethering mobile device S550. Then, the SPCD requests an STC connection through the tethering mobile device S551. This request includes a digital certificate along with identification of each of the SPCD, an application server, an STC account associated with a service provider, and a home mobile operator. The digital certificate is provided by the service provider and is installed on the memory of the SPCD. Once this request is received, the tethering mobile device performs a preliminary verification to determine if the request is acceptable S552. If a user of the tethering mobile device has set the tethering mobile device to deny STC requests, then the request is denied, and the SPCD is disconnected from the tethering mobile device S557. If the user has set the tethering mobile device to allow STC requests, then the request is forwarded to the network, where the access control server, STC server, and application server complete the authorization S553 as described herein. The SPCD is notified that the tethering mobile device has accepted the request and forwarded the request to the network S554. Once the network authorizes the STC connection, the tethering mobile device begins forwarding data between the SPCD and the application server S555. This continues until the SPCD has completed the data transfer, at which time the STC connection is ended S556.

If the SPCD and the tethering mobile device are owned by the same user, then these devices may have a permanent pairing relationship based on password, rendering step S550 optional or unnecessary to perform every time. Both the tethering mobile device and the SPCD ensure that STC support is enabled. The digital certificate may include information from a SIM card provided by the service provider. The SPCD may also have a unique Media Access Control (MAC) ID. If the digital certificate is well managed, then it provides a fraud-proof identity of the SPCD.

Figure 6:
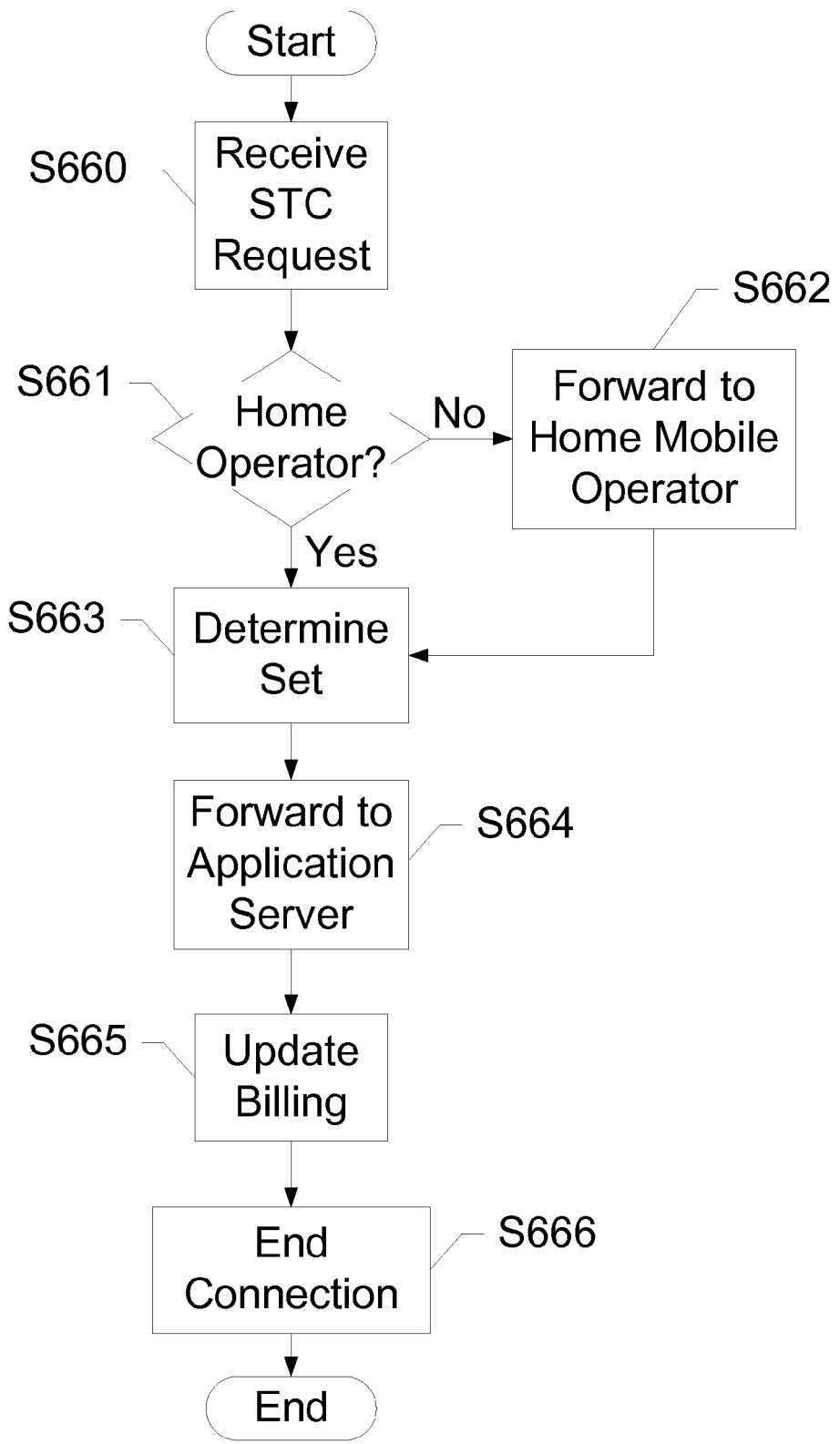
FIG. 6 shows a method for establishing sponsored tethered connectivity through a tethering mobile device, according to an exemplary embodiment of the present subject disclosure.

FIG. 6 shows a method for establishing a limited functionality cellular service through a tethering mobile device, according to an exemplary embodiment of the present subject disclosure. A server on the network receives an STC request from a special purpose connected device (SPCD) through a tethering mobile device S660. The server first determines whether or not the home mobile operator of the SPCD identified in the STC request is the same as the mobile operator of the server S661. If the server is not from the same mobile operator, then the STC request is forwarded to that mobile operator S662. If the server is from the same mobile operator, then the STC request proceeds through the server. In either case, the server determines that the application server ID, the STC account ID, and the home mobile operator, are each part of a pre-approved set S663. Next, the STC request is forwarded to an application server, with a proposed billing policy S664. The server updates the billing so that the STC connection is billed to the service provider, and not to an account under the tethering mobile device S665. Finally, The STC connection ends when the SPCD or the application server closes the session S666.

The processes shown in FIG. 6 have been shown herein being performed by an access control server, an STC server, and an AAA Server. In further embodiments, these processes may occur on any number of servers in any combination. The servers of some embodiments include the processes of an application server as well.

Figure 7:
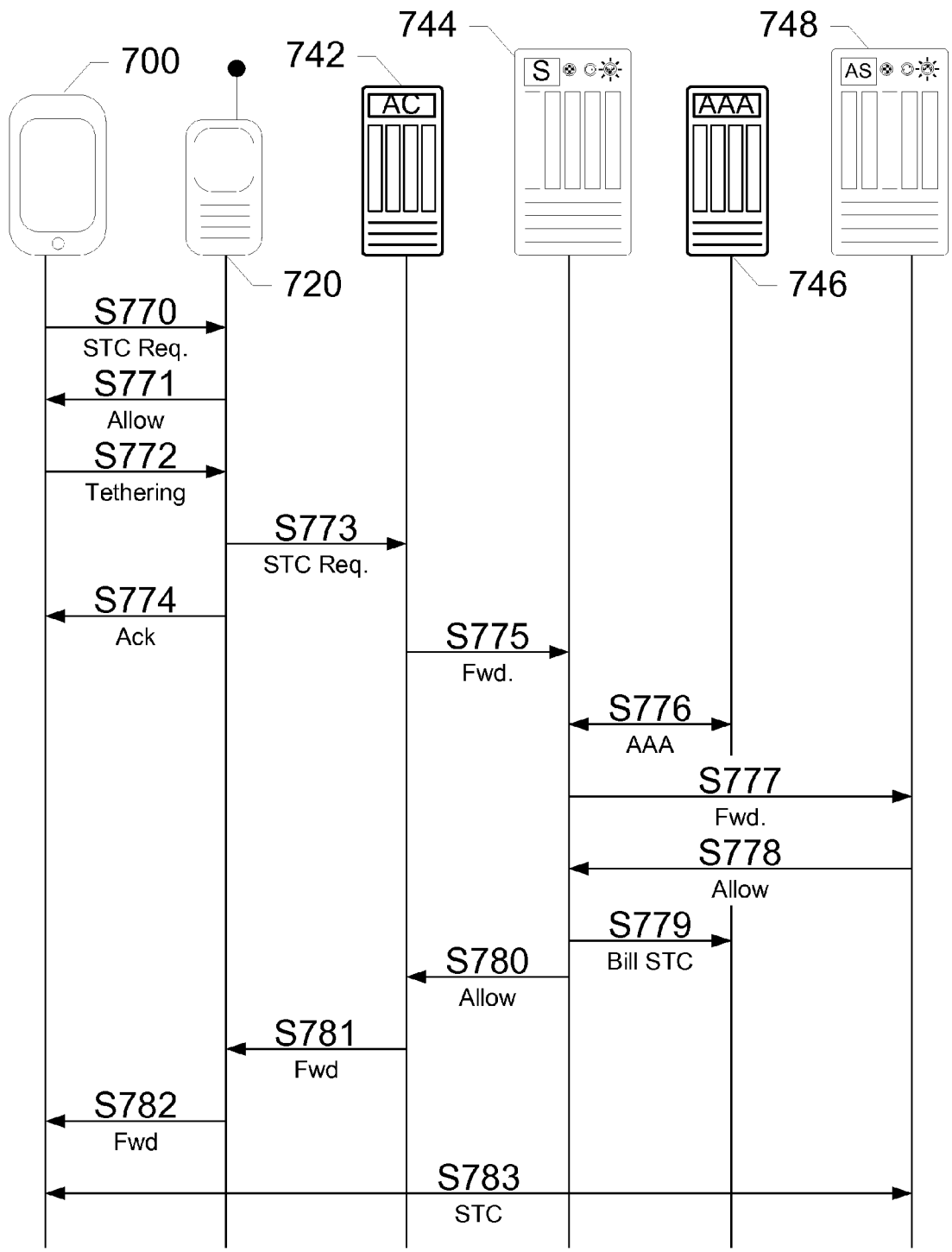
FIG. 7 shows a process flow diagram for establishing sponsored tethered connectivity through a tethering mobile device, according to an exemplary embodiment of the present subject disclosure.

FIG. 7 shows a process flow diagram for establishing sponsored tethered connectivity (STC) through a tethering mobile device 720, according to an exemplary embodiment of the present subject disclosure. In this exemplary embodiment, the process begins when a special purpose connected device (SPCD) 700 sends an STC request to a tethering mobile device 720 (S770). Tethering mobile device 720 first determines that a user has allowed tethering capabilities for this device, and confirms this to SPCD 700 (S771). (S772). Next, SPCD 700 sends a digital certificate along with identification information for each of SPCD 700, an application server 748, an STC account associated with the service provider, and the home mobile operator of SPCD 700 to the tethering mobile device. Tethering mobile device 720 performs a preliminary verification of the STC request, forwards the STC request to an access control server 742 (S773), and responds to SPCD 700 with an acknowledgement (S774). Access control server 742 receives the STC request, determines that the STC request is from the same home mobile operator, and forwards it to an STC server 744 (S775). STC server 744 requests an authentication, authorization, and accounting (AAA) server 746 (S776) to determine that the application server ID, the STC account ID, and the home mobile operator are each part of a pre-approved set. STC server 744 forwards the STC request to application server 748 with a proposed billing policy (S777). Application server 748 inspects the STC request, the validity of the digital certificate, and ID of SPCD 700. Mutual authentication is optionally performed by the Application server 748 presenting a certificate to the SPCD 700 to ensure that the SPCD is not communicating to a fraudulent entity. Application server 748 verifies the service policy and the home mobile operator, then notifies STC server 744 to allow the STC connection (S778). Once STC server 744 receives verification, the billing is updated (S779) to ensure that the STC connection is billed separately from an account associated with tethering mobile device 720, and charged to the STC account ID associated with the service provider. The authorization grant is forwarded from STC server 744 through access control server 742 (S780) and tethering mobile device (S781) to SPCD 700 (S782). Application server 748 and SPCD 700 perform an authentication (S783), then begin the STC connection. The STC connection ends when SPCD 700 or application server 748 closes the session.

This closure may be based on a timeout condition created by a loss of the connection through the tethering mobile device and the network. The authentication in S776 and S783 may be based on the digital certificate (Extensible Authentication Protocol Transport Layer Security, EAP-TLS) or SIM card (Extensible Authentication Protocol Authentication and Key Agreement, EAP-AKA). This verifies that the request was submitted by the SPCD provisioned by the application server and not a fraudulent copy submitted by another device. This method does not require any user intervention to supply a password, and so the SPCD does not need a special keyboard and display. This is a convenient and secure approach for the end-user of the SPCD. Other embodiments include options to prompt the user to supply a user ID and a password. In further embodiments, application server databases maintain a list of SPCD IDs that have accounts with the application server. In other embodiments, different forms of authentication are used.

FIG. 8 shows a screenshot of STC settings 890 available for a tethering mobile device 820 capable of allowing limited functionality cellular service, according to an exemplary embodiment of the present subject disclosure. The tethering mobile device 820 displays on its display 822 an STC settings application 890 including an option to allow all STC requests 891 and an option to block all STC requests 892. If the user elects to allow all STC requests, then a black list 893 is applied to block STC requests from specific devices. If the user elects to block all STC requests, then a white list 894 is applied to allow STC requests from specific devices. STC settings 890 are recorded onto the memory of tethering mobile device 820 upon activation of "Save" button 895. If the user wishes to discard any changes without recording them to the memory, then the user activates "Cancel" button 896. Buttons 895 and 896 are activated using keypad 824, or by touching display 822 in the case that display 822 is touch-sensitive. STC Settings are graphically output on display 822 of tethering mobile device 820.

The STC Settings in FIG. 8 show some of the more essential features of STC settings. Other embodiments of the STC settings include many more features and options in different combinations. These options include regulation based on time and date, additional security measures, compatibility limitations, SPCD type limitations, bandwidth limitations, low battery limitations, etc.

Figure 9:
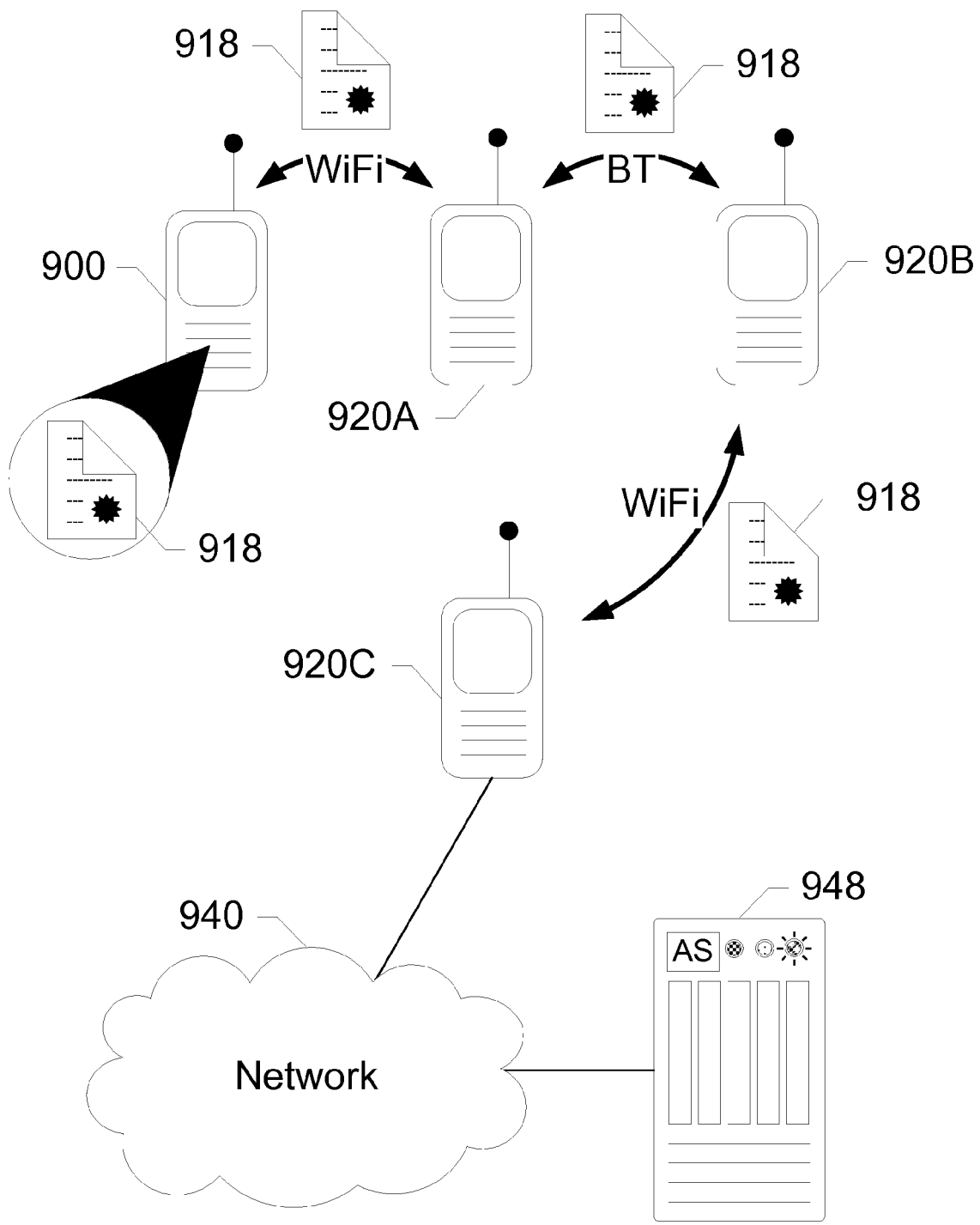
FIG. 9 shows a multiple-hop network for supplying sponsored tethered connectivity to a tethering mobile device, according to an exemplary embodiment of the present subject disclosure.

Some STC connections may require more than one tethering mobile device. For example, if the SPCD can find tethering mobile devices in range, but none of the tethering mobile devices have network connections, then a chain of tethering mobile devices may be used to connect to the network. Each tethering mobile device searches for another tethering mobile device with network access. This process may repeat several times before a network connection is found. Once a network connection is found, the tethering mobile devices communicate in series to pass information to and from the SPCD and the network. This series of connections is referred to as a multiple-hop system FIG. 9 shows a multiple-hop system for supplying sponsored tethered connectivity (STC) to a tethering mobile device 900, according to an exemplary embodiment of the present subject disclosure. The system includes a tethering mobile device acting as a special purpose connected device (SPCD) 900 having a digital certificate 918, a first intermediate tethering mobile device 920A, a second intermediate tethering mobile device 920B, a gateway tethering mobile device 920C, a network 940, and an application server 948. As SPCD 900 places a call or generates a beacon, for instance while attempting an E911 call, an STC request is broadcast to all devices within a range of SPCD 900. The request is received by first intermediate tethering mobile device 920A across a WiFi connection. First intermediate tethering mobile device 920A is for some reason unable to or disabled from connecting to network 940. However, first intermediate tethering mobile device 920A is programmed to forward the broadcast to other devices in the area, such as second intermediate tethering mobile device 920B, across a BLUETOOTH or equivalent wireless connection. Second intermediate tethering mobile device 920B is similarly unable to connect to application server 948 across network 940, and therefore forwards the broadcast across a Wi-Fi connection. The broadcast is received by gateway tethering mobile device 920C. Gateway tethering mobile device 920C has a network connection capable of transmitting data to servers and other entities across network 940.

Once the connection is chained through to application server 948, SPCD 900 sends digital certificate 918 through first intermediate tethering mobile device 920A, second intermediate tethering mobile device 920B, and gateway tethering mobile device 920C to network 940 and eventually application server 948. Once the connection is verified, application server 948 connects the 911 call to the emergency services via tethering mobile devices 920A-920C.

In FIG. 9 the application server is for an E911 system. However, a multiple-hop network can be created for any SPCD connecting to any application server. A chain of tethering mobile devices can be as short or as long as the chain needs to be in terms of number of tethering mobile devices. Further, users of the tethering mobile devices in the multiple-hop chain are not billed for any network resources being used by SPCD 900. Instead, intelligent billing on the network ensures that only the service provider or owner of application server 948 is billed for the data usage. The tethering mobile devices of FIG. 9 use alternating short-range wireless communication formats to enable a constant bidirectional connection. However, the tethering mobile devices in other embodiments of multiple-hop networks communicate using the same short-range communication format if necessary. These multiple-hop networks result in intermittent communication. Any combination of short-range communication is possible in multiple-hop networks including using cellular RF transceivers to communicate between tethering mobile devices. Many different possible combinations of communication formats will become apparent to those having skill in the art upon reading this disclosure.

The SPCD must communicate with the home mobile operator of the SPCD. However, the home mobile operator of the tethering mobile device may not be the same as the home mobile operator of the SPCD. Moreover, the tethering mobile device may be roaming on yet another serving mobile operator. There can be a matrix of scenarios as to whether the SPCD home mobile operator, tethering mobile device home mobile operator, and serving mobile operator are the same. However, the SPCD can be used in any network, even if the tethering mobile device does not have roaming capability for the tethering.

Figure 10:
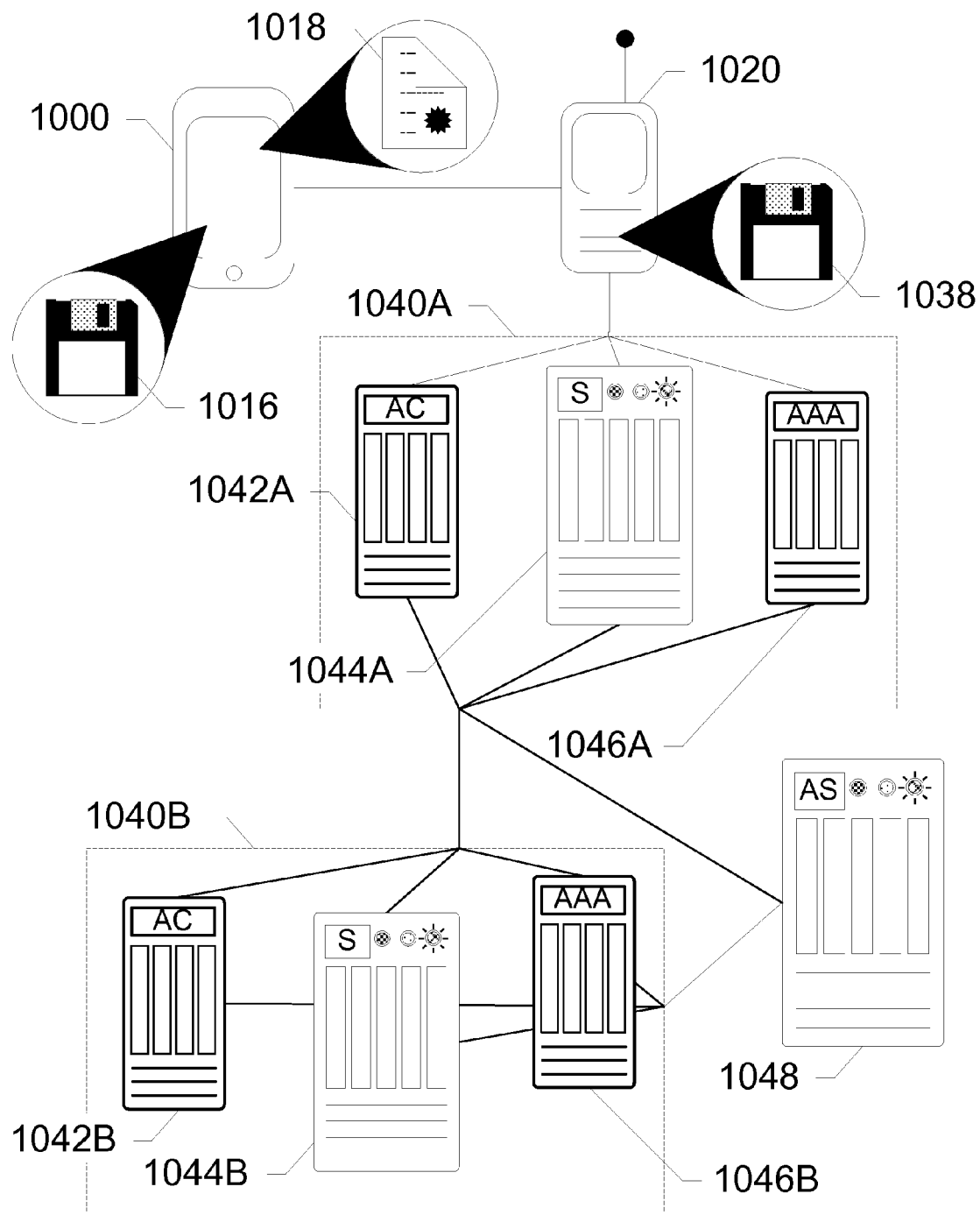
FIG. 10 shows a system for establishing sponsored tethered connectivity to a special purpose connected device through a tethering mobile device on a different network, according to an exemplary embodiment of the present subject disclosure.

FIG. 10 shows a system for establishing sponsored tethered connectivity (STC) to a special purpose connected device (SPCD) 1000 through a tethering mobile device 1020 on a network 1040A of a different mobile operator, according to an exemplary embodiment of the present subject disclosure. The SPCD 1000 has been provisioned with secure credentials, such as a digital certificate, SIM, etc., that are linked to a home mobile operator 1040B. This system includes SPCD 1000 having SPCD logic 1016 and digital certificate 1018, tethering mobile device 1020 having tether logic 1038, a network of a different mobile operator indicated by dashed line 1040A, a network of the home mobile operator indicated by dashed line 1040B, and an application server 1048 in communication with both serving network 1040A and home network 1040B. Each network 1040A and 1040B respectively includes an access control server 1042A/B, an STC server 1044A/B, and an authentication, authorization, and accounting (AAA) Server 1046A/B. Under instruction from SPCD logic 1016, SPCD 1000 sends STC requests to tethering mobile device 1020. For verification, SPCD 1000 sends a digital certificate along with identification information for each of SPCD 1000, application server 1048, an STC account associated with the service provider, and the home mobile operator of the SPCD through tethering mobile device 1020 to 1040B. Tethering mobile device 1020 performs a preliminary verification of the STC request before forwarding the STC request to serving access control server 1042A. Serving access control server 1042A receives the STC request, determines that the STC request is from a different mobile operator, and forwards the STC request to home STC server 1044B. Home STC server 1044B works with home AAA server 1046B to determine that the application server ID, the STC account ID, and the home mobile operator, are each part of a pre-approved set. Application server 1048 inspects the STC request, the validity of the digital certificate, and the ID of SPCD 1000. Application server 1048 verifies the service policy offered by the home mobile operator 1040B and the serving mobile operator 1040A, then notifies serving STC server 1044A to allow the STC connection. Serving AAA server 1046A updates billing to ensure that the STC connection is billed separately from an account associated with tethering mobile device 1020, and billed to an STC account ID associated with the service provider. Once provisioning is complete, application server 1048 and SPCD 1000 engage in an STC connection. The STC connection ends when SPCD 1000 or application server 1048 closes the session for any of the reasons described herein, or other possible reasons for terminating the session.

The billing for the STC connection can be based per connection, time of connection, amount of data transmitted during the connection, type of data transferred, as a prepaid connection, or any combination of those and other factors.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A tethering mobile device comprising:
a short-range wireless communication transceiver;
a long-range wireless communication transceiver;
a processor; and
a memory storing instructions that, when executed by the processor, cause the processor to perform operations comprising
receiving, via the short-range wireless communication transceiver, a sponsored tethered connectivity request from a special purpose connectivity device, the sponsored tethered connectivity request comprising account information identifying an account belonging to a service provider,
in response to the sponsored tethered connectivity request, establishing, via the long-range wireless communication transceiver, a sponsored tethered connectivity connection between the special purpose connectivity device and an application server associated with the service provider, and
forwarding, via the sponsored tethered connectivity connection, data between the special purpose connectivity device and the application server associated with the service provider, wherein a cost of usage of the sponsored tethered connectivity connection is billed to the account belonging to the service provider instead of an account associated with the tethering mobile device and instead of an account associated with the special purpose connectivity device.

2. The tethering mobile device of claim 1, wherein the sponsored tethered connectivity request further comprises an identification of the special purpose connectivity device.

3. The tethering mobile device of claim 1, wherein the sponsored tethered connectivity request further comprises authentication information to validate the special purpose connectivity device for establishment of the sponsored tethered connectivity connection.

4. The tethering mobile device of claim 1, wherein the operations further comprise editing a setting for allowing the sponsored tethered connectivity connection.

5. The tethering mobile device of claim 4, wherein the setting comprises an option to block all sponsored tethered connectivity requests and further comprises a white list, the white list comprising the special purpose connectivity device such that sponsored tethered connectivity requests received by the tethering mobile device from the special purpose connectivity device are allowed.

6. The tethering mobile device of claim 1, wherein the tethering mobile device is a gateway tethering mobile device which receives the sponsored tethered connectivity request from the special purpose connectivity device through a plurality of tethering mobile devices connected in series.

7. The tethering mobile device of claim 1, wherein the operations further comprise performing a preliminary verification of the sponsored tethered connectivity request.

8. The tethering mobile device of claim 7, wherein performing the preliminary verification of the sponsored tethered connectivity request comprises determining whether tethering capabilities are allowed for the tethering mobile device, and wherein the operations further comprise providing, to the special purpose connectivity device, an acknowledgment that the tethering mobile device has accepted the sponsored tethered connectivity request.

9. The tethering mobile device of claim 1, further comprising a display and wherein the operations further comprise causing a message to be displayed via the display, the message comprising information about the sponsored tethered connectivity connection and an option to proceed with the sponsored tethered connectivity connection.

10. A memory device storing instructions that, when executed by a processor of a tethering mobile device comprising a short-range wireless communication transceiver and a long-range wireless communication transceiver, cause the processor to perform operations comprising:
- receiving, via the short-range wireless communication transceiver, a sponsored tethered connectivity request from a special purpose connectivity device, the sponsored tethered connectivity request comprising account information identifying an account belonging to a service provider;
- in response to the sponsored tethered connectivity request, establishing, via the long-range wireless communication transceiver, a sponsored tethered connectivity connection between the special purpose connectivity device and an application server associated with the service provider; and
- forwarding, via the sponsored tethered connectivity connection, data between the special purpose connectivity device and the application server associated with the service provider, wherein a cost of usage of the sponsored tethered connectivity connection is billed to the account belonging to the service provider instead of an account associated with the tethering mobile device and instead of an account associated with the special purpose connectivity device.

11. The memory device of claim 10, wherein the sponsored tethered connectivity request further comprises authentication information to validate the special purpose connectivity device for establishment of the sponsored tethered connectivity connection.

12. The memory device of claim 10, wherein the operations further comprise editing a setting for allowing the sponsored tethered connectivity connection.

13. The memory device of claim 12, wherein the setting comprises an option to block all sponsored tethered connectivity requests and further comprises a white list, the white list comprising the special purpose connectivity device such that sponsored tethered connectivity requests received by the tethering mobile device from the special purpose connectivity device are allowed.

14. The memory device of claim 10, wherein the tethering mobile device is a gateway tethering mobile device which receives the sponsored tethered connectivity request from the special purpose connectivity device through a plurality of tethering mobile devices connected in series.

15. The memory device of claim 10, wherein the operations further comprise performing a preliminary verification of the sponsored tethered connectivity request.

16. The memory device of claim 15, wherein performing the preliminary verification of the sponsored tethered connectivity request comprises determining whether tethering capabilities are allowed for the tethering mobile device, and wherein the operations further comprise providing, to the special purpose connectivity device, an acknowledgment that the tethering mobile device has accepted the sponsored tethered connectivity request.

17. The memory device of claim 10, wherein the tethering mobile device further comprises a display and wherein the operations further comprise causing a message to be displayed via the display, the message comprising information about the sponsored tethered connectivity connection and an option to proceed with the sponsored tethered connectivity connection.

18. A server for establishing a sponsored tethered connectivity, the server comprising:
- a processor; and
- a memory storing instructions that, when executed by the processor, cause the processor to perform operations comprising
  - receiving, via a tethering mobile device, a sponsored tethered connectivity request from a special purpose connectivity device, the sponsored tethered connectivity request comprising account information identifying an account belonging to a service provider, and
  - establishing, through the tethering mobile device, a sponsored tethered connectivity connection between the special purpose connectivity device and an application server associated with the service provider, wherein a cost of usage of the sponsored tethered connectivity connection is billed to the account belonging to the service provider instead of an account associated with the tethering mobile device and instead of an account associated with the special purpose connectivity device.

19. The server of claim 18, wherein the sponsored tethered connectivity request further comprises an identification of the special purpose connectivity device.

20. The server of claim 18, wherein the sponsored tethered connectivity request further comprises authentication information to validate the special purpose connectivity device for establishment of the sponsored tethered connectivity connection.

* * * * *